US011524485B2

(12) United States Patent
Smith

(10) Patent No.: US 11,524,485 B2
(45) Date of Patent: Dec. 13, 2022

(54) FRACTURE FILM FOR PEELABLE MEMBRANE CONTAINERS

(71) Applicant: SONOCO DEVELOPMENT, INC., Hartsville, SC (US)

(72) Inventor: Allyson Smith, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

(21) Appl. No.: 17/365,523

(22) Filed: Jul. 1, 2021

(65) Prior Publication Data

US 2021/0323271 A1 Oct. 21, 2021

Related U.S. Application Data

(63) Continuation of application No. 16/512,864, filed on Jul. 16, 2019, now Pat. No. 11,084,249.

(51) Int. Cl.
| | |
|---|---|
| B32B 7/12 | (2006.01) |
| B32B 7/06 | (2019.01) |
| B32B 15/085 | (2006.01) |
| B32B 15/09 | (2006.01) |
| B32B 27/08 | (2006.01) |
| B32B 27/30 | (2006.01) |
| B32B 27/36 | (2006.01) |

(52) U.S. Cl.
CPC .......... *B32B 7/12* (2013.01); *B32B 7/06* (2013.01); *B32B 15/085* (2013.01); *B32B 15/09* (2013.01); *B32B 27/08* (2013.01); *B32B 27/306* (2013.01); *B32B 27/36* (2013.01); *B32B 2250/03* (2013.01); *B32B 2307/748* (2013.01)

(58) Field of Classification Search
CPC .. B32B 7/12; B32B 7/06; B32B 27/08; B32B 27/306; B32B 27/36
USPC .......................................................... 428/200
See application file for complete search history.

(56) References Cited

U.S. PATENT DOCUMENTS

| | | |
|---|---|---|
| 6,302,321 B1 | 10/2001 | Reese et al. |
| 7,314,669 B2 | 1/2008 | Galloway |
| 7,364,779 B2 | 4/2008 | Nomula |
| 8,147,934 B2 | 4/2012 | Berbert |
| 8,221,872 B2 | 7/2012 | Yaoi et al. |
| 8,293,348 B2 | 10/2012 | Yuno et al. |
| 8,354,132 B2 | 1/2013 | Stephens et al. |

(Continued)

FOREIGN PATENT DOCUMENTS

EP 2746048 6/2014

OTHER PUBLICATIONS

Preliminary Report of Patentability for International application No. PCT/US2020/035269; 10 pages, dated Jan. 27, 2022. [Only new art cited herein; International Search Report and Written Opinion including all art cited therein has been cited by the Applicant via IDS filed on Jul. 1, 2021].

(Continued)

*Primary Examiner* — Betelhem Shewareged
(74) *Attorney, Agent, or Firm* — Nelson Mullins Riley & Scarborough LLP

(57) ABSTRACT

The invention comprises a fracture film for sealing a peelable membrane to a container comprising a first layer of high density polyethelene, a second layer of polybutene-1/ethylene-vinyl acetate, wherein the second layer is bonded to the first layer, and a third layer of ethylene-acrylic acid, wherein the third layer is bonded to the second layer.

19 Claims, 2 Drawing Sheets

(56) References Cited

U.S. PATENT DOCUMENTS

| | | | |
|---|---|---|---|
| 8,642,144 | B2 | 2/2014 | Curie et al. |
| 8,703,265 | B2 | 4/2014 | Thorstensen-Woll et al. |
| 9,555,603 | B2 | 1/2017 | Gillespie |
| 9,975,685 | B2 | 5/2018 | Wolters et al. |
| 2005/0252918 | A1 | 11/2005 | McKnight et al. |
| 2014/0061197 | A1 | 3/2014 | Thorstensen-Woll |
| 2016/0325896 | A1 | 11/2016 | Thorstensen-Woll |
| 2017/0158404 | A1 | 6/2017 | Gillespie |
| 2017/0173929 | A1 | 6/2017 | Glaser et al. |
| 2021/0323271 | A1* | 10/2021 | Smith ................. B32B 7/06 |

OTHER PUBLICATIONS

Thomas I. Butler, et al., PE-Based Multilayer Film Structures; Multilayer Flexible Packaging (Second Edition), Plastic Design Library, 2016, pp. 281-310. https://www.sciencedirect.com/science/article/pii/B978032337100100017X (Abstract only).

Hwo, Charles, Polybutylene Blends as Easy Open Seal Coats for Flexible Packaging and Lidding, Journal of Plastic Film and Sheeting, https://journals.sagepub.com/doi/10.1177/875608798700300403.

International Search Report and Written Opinion of Application No. PCT/US2020/035269, dated Aug. 26, 2020; 16 pages.

Melissa Diskin et al.; "The Effect of Polybutylene on Seal Strength of Eva/Polybutylene Seal Blends in Medical Device Packaging"; 70th Annual Technical Conference of the Society of Plastics Engineers, Apr. 2-4, 2012; Published vol. 2, Jan. 1-Apr. 4, 2012, pp. 1352-13256, XP055723377, US ISBN: 978-1-62276-083-1.

* cited by examiner

FRACTURE FILM FOR PEELABLE MEMBRANE CONTAINERS

CROSS-REFERENCE TO RELATED APPLICATIONS

This application is a continuation of U.S. patent application Ser. No. 16/512,864, entitled "FRACTURE FILM FOR PEELABLE MEMBRANE CONTAINERS," filed Jul. 16, 2019, each of which is incorporated herein in its entirety.

FIELD OF THE INVENTION

This invention relates generally to a fracture film for adhering peelable membranes to containers.

BACKGROUND

A number of products, and particularly food products, are packaged in containers wherein one of the container ends is closed with a thin, peelable foil membrane. The container is opened by peeling the foil membrane from the end of the container to expose an opening into the container. Such membranes typically comprise a flexible foil/polymer composite structure which is heat sealed to a metal can end. Laminated foil membranes such as these often employ Surlyn® or other heat-sealing coatings to adhere the membrane to the container end.

However, such foil membrane constructions have certain disadvantages. Surlyn® is an expensive sealant and suffers from the "age-up" phenomenon whereby the strength of the seal to the metal end tends to increase with age, which is undesirable. This issue is particularly problematic in hot and/or humid environments, limiting global growth due to climate concerns and a lack of climate-controlled warehousing. The age-up phenomenon causes the seal to become more difficult to peel away from the container over time. In some cases, the membrane actually transforms from a peelable seal to a "lock-up" seal that cannot be opened by a consumer at all. The only way to manage this issue is to maintain strict controls over the initial seal strength via burst testing and pop/peel testing, requiring container/membrane combinations to perform below the upper specification limits for the particular materials.

Surlyn® also has a relatively narrow heat-sealing temperature window. If the temperature is too high, the seal strength will be too great to provide easy peelability of the lid. Likewise, if the temperature is too low, the seal strength may be too low to keep the lid from inadvertently detaching from the metal end. It can be difficult to control the processing conditions when using Surlyn® so as to stay within the desired temperature window. Further, Surlyn® seals more readily to certain types of metals than others and even for a given type of metal end, there can be substantial variability in the surface characteristic of the metal, which can affect the strength of the seal and the temperature at which the seal must be processed. Such variability is not readily predicted or accounted for, and hence the strength of the seals tends to have substantial variability. Accordingly, an alternative closure system has been sought.

SUMMARY OF THE INVENTION

It is desirable for a flexible membrane lid to be sealed to a container end with sufficient strength to prevent inadvertent detachment of the lid during shipping and handling, prior to opening the container. On the other hand, it is also desirable for the consumer to be able to peel the lid off the container end with relatively little force, so that people of diverse ages and abilities can open the container, and so that the lid comes off in one piece rather than tearing. Through hard work and ingenuity, the inventors have developed a product which reaches these seemingly opposing objectives of high seal strength and low peel force.

In an embodiment, the invention is directed to a fracture film for sealing a peelable membrane to a container comprising a first layer comprising high density polyethelene; a second layer comprising polybutene-1/ethylene-vinyl acetate, wherein the second layer is bonded to the first layer; and a third layer comprising ethylene-acrylic acid, wherein the third layer is bonded to the second layer.

In another embodiment, the invention is directed to a container comprising a bottom end; at least one sidewall extending upwardly from the bottom end and terminating in an open end; a peelable membrane sealed to the open end of the at least one sidewall, wherein the peelable membrane comprises at least one of the following layers: a polyethylene terephthalate layer; a foil layer; and a cast nylon layer; and wherein the peelable membrane comprises a fracture film which comprises: a first layer comprising high density polyethelene; a second layer comprising polybutene-1/ethylene-vinyl acetate, wherein the second layer is bonded to the first layer; and a third layer comprising ethylene-acrylic acid, wherein the third layer is bonded to the second layer.

In yet another embodiment, the invention comprises a method for manufacturing a container having a peelable membrane comprising providing a peelable membrane; providing a container having a metal end; coextruding a fracture film which comprises a first layer of high density polyethelene, a second layer of polybutene-1/ethylene-vinyl acetate bonded to the first layer, and a third layer of ethylene-acrylic acid bonded to the second layer; laminating the high density polyethylene layer of the fracture film to the peelable membrane to form a laminate; cutting the laminate to fit the metal end; and induction sealing the ethylene-acrylic acid layer of the laminate to the metal end.

BRIEF DESCRIPTION OF THE DRAWINGS

Figure 1:
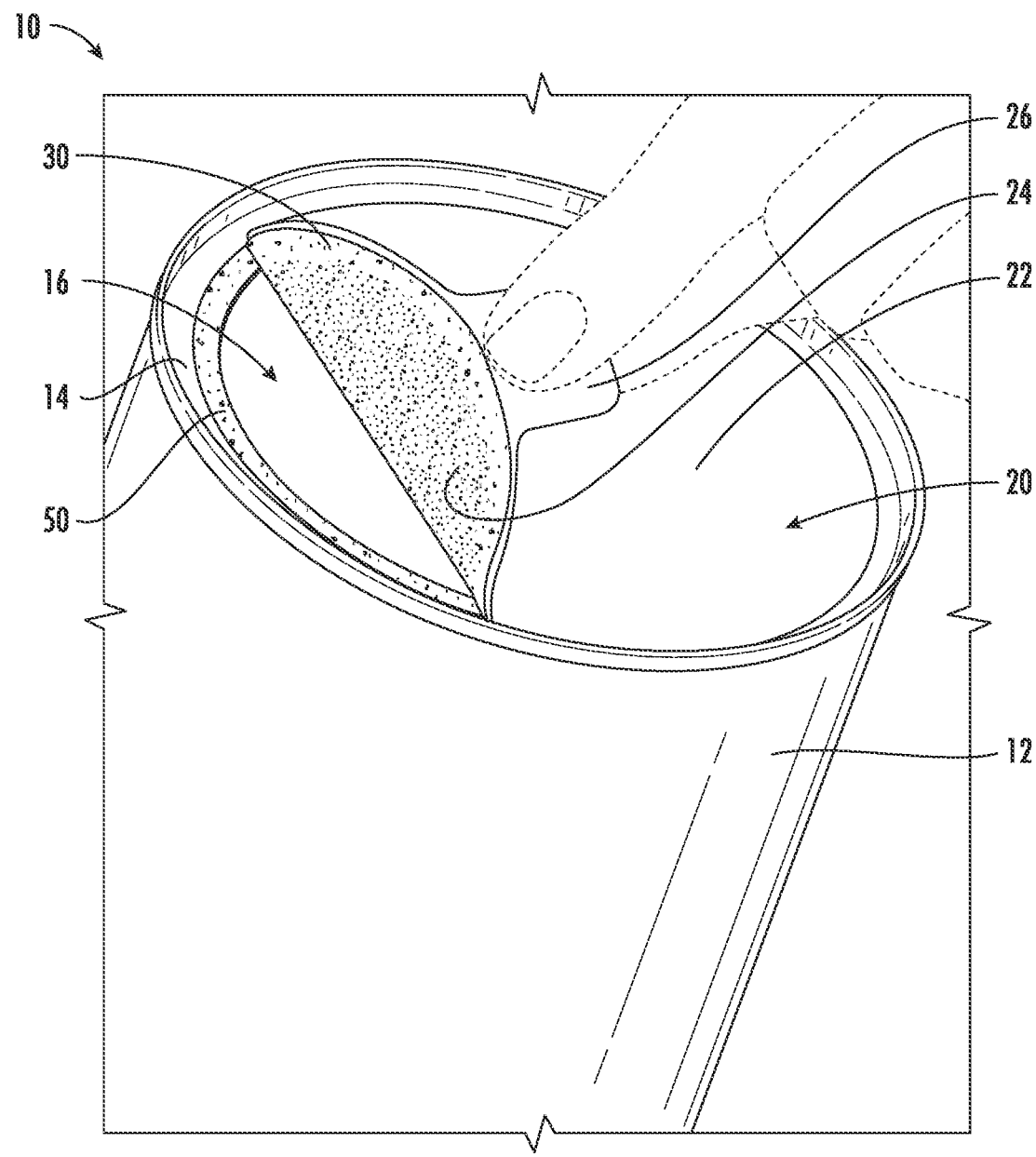

Having thus described the disclosure in general terms, reference will now be made to the accompanying drawings, which are not necessarily drawn to scale, and wherein:

FIG. 1 illustrates a perspective view of the container and membrane lid in an embodiment of the present invention.

Figure 2:
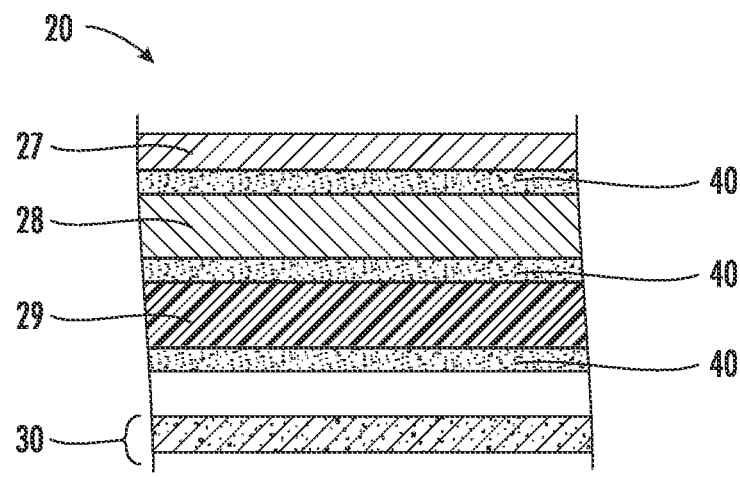

FIG. 2 illustrates a cross-sectional view of the membrane lid and fracture film in an embodiment of the present invention.

Figure 3:
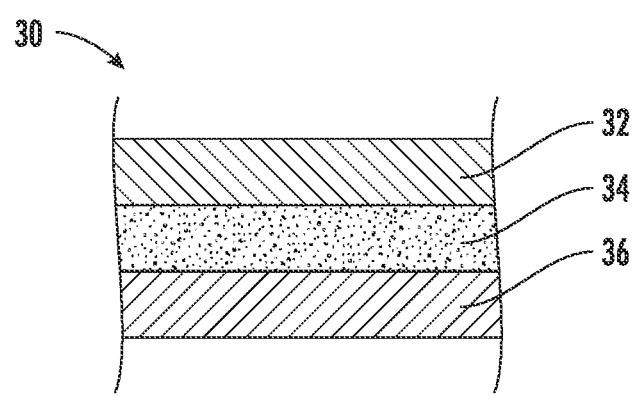

FIG. 3 illustrates a cross-sectional view of the fracture film in an embodiment of the present invention.

DETAILED DESCRIPTION OF THE INVENTION

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As shown in FIG. 1, in an embodiment, the invention comprises a container 10 to which a flexible membrane lid 20 is affixed. The flexible membrane lid 20 may be affixed to the container 10 using a fracture film 30. In an embodiment, an overcap may be applied to the container over the flexible membrane lid 20. The overcap may be used to reclose the container after initial opening.

In an embodiment, the container 10 of the invention comprises metal. In another embodiment, however, the container of the invention may comprise paper, plastic or any other material or combination of materials known in the art. Likewise, the container 10 of the invention can be made by various processes. For instance, the container 10 can be formed of plastic by thermoforming, blow-molding, or injection-molding, or can be formed of composite materials (e.g., paperboard with a liner of impervious material such as polymer film and/or foil) by spiral-winding or convolute-wrapping processes.

In an embodiment, the container 10 of the invention comprises a closed bottom end and at least one sidewall 12. The container may be cylindrical, elliptical or ovular in nature or may have multiple sidewalls, comprising a generally rectangular or square cross-section, for example. Any container shape known in the art may be utilized. In an embodiment, the bottom end, sidewall(s) and top end generally form a receptacle having an interior which may house food products or the like.

In an embodiment, the end of the container 10 to which the flexible membrane 20 is affixed is the top end of the container. However, the flexible membrane 20 may be affixed to the bottom or a sidewall of the container 10 in certain embodiments. In an embodiment, the end of the container 10 to which the flexible membrane 20 is affixed may be metal, plastic, paper, or any combination thereof. In a particular embodiment, the container end is metal and comprises tin plated steel or aluminum.

In an embodiment, the container comprises a metal end 14 which is the top of the container sidewall 12 or is attached to the top of the container sidewall 12, optionally by double-seaming the metal end 14 to a flange at the top of the container. The metal end 14 may be referred to as a metal ring. Alternatively, the metal end 14 may be integral with the container sidewall. In an embodiment, the metal end 14 may define an opening 16 into the container interior. The metal end 14 may comprise a rim or flange to which the membrane lid 20 is sealed.

The flexible membrane lid 20 of the invention may be sealed to the metal end 14 so as to cover the opening 16 defined therein. The membrane lid 20 generally includes one or more layers providing strength and/or barrier properties. In an embodiment, the membrane lid 20 comprises an upper surface 22 proximate the exterior of the container and a lower surface 24 proximate the interior of the container. In an embodiment, the membrane lid 20 comprises a fracture film 30 disposed on the lower surface 24 of the lid. The function of the fracture film 30 is to seal the membrane lid 20 to the metal end 14 and allow the membrane lid 20 to release from the metal end 14 upon peeling back by a consumer.

In some embodiments, the fracture film 30 may be disposed over the entire surface lower surface 24 of the membrane lid 20. In an embodiment, the membrane lid 20 includes a pull tab 26 that is not sealed to the metal end 14 (i.e. does not have fracture film 30 disposed thereon) so that it can be readily grasped and pulled to remove the membrane lid 20 from the metal end 14.

In another embodiment, the fracture film 30 may be disposed circumferentially or about the perimeter of the membrane lid 20. That is, the fracture film 30 may not cover the entire lower surface 24 of the membrane lid 20.

In an embodiment, the membrane lid 20 comprises multiple layers. In an embodiment the layers of the membrane lid 20 may comprise materials such as metal foil, polymer films, metallized polymer films (i.e., film having a very thin coating of substantially pure metal deposited thereon), paper, or any other materials known in the art. In an embodiment, at least one layer of the membrane lid 20 comprises a barrier layer. Various materials can be used as barriers, including metal foil, metallized polyester, non-metallized polymer film (e.g., EVOH), and others. A combination of two or more such barrier layers can be used.

In a particular embodiment, the membrane lid 20 comprises a layered structure which includes three layers. This embodiment should not be limiting, however, as any number of layers or composition of layers may be utilized herein. In an embodiment, the membrane lid 20 comprises the following three layers: polyethylene terephthalate (PET), a metal foil, and nylon. In an embodiment, the membrane lid 20 may comprise a layered structure as shown in FIG. 2. In this embodiment, the outer layer 27 of the membrane lid 20 may comprise PET, the intermediate layer 28 of the membrane lid 20 may comprise a metal foil, and the inner layer 29 of the membrane lid 20 may comprise nylon. In an embodiment, the nylon layer comprises cast nylon.

In an embodiment, the PET layer comprises a PET layer which is between about 45 and 50 gauge (ga) in thickness. In a particular embodiment, the PET layer may comprise 48 ga (½ mil). In an embodiment, the foil layer may be between about 0.5 and 1.5 mil in thickness. In a particular embodiment, the foil layer may be about 1.0 mil. In an embodiment, the cast nylon layer may be between about 70 and 80 ga in thickness. In a particular embodiment, the cast nylon layer may be about 75 ga.

In an embodiment, the outer layer 27, intermediate layer 28, and inner layer 29 may be adhered to each other using one or more adhesives, to form adhesive layers 40 between each layer. Likewise, an adhesive layer 40 may be disposed between the inner layer 29 and the fracture film 30. Any adhesive known in the art, or any combination of adhesives known in the art, may be utilized in this embodiment. In some embodiments, the adhesive may be a two-component adhesive. In other embodiments, the adhesive may be a single component adhesive. The adhesive may be solvent-based or solventless. In any case, the adhesive selected should have adhesive forces which are stronger than the adhesive forces within the fracture film 30, to ensure that the separation of the peelable membrane from the container end 14 occurs internally, within the fracture film 30, and not between any of the layers: outer layer 27, intermediate layer 28, inner layer 29, and/or fracture film 30. In an embodiment, the adhesive layer(s) 40 comprises a permanent adhesive.

In an embodiment, the fracture film 30 comprises a first layer 32, a second layer 34, and a third layer 36. In an embodiment, the first layer 32 is the top layer of the fracture film 30, which is adjacent the lower surface 24 of the membrane lid 20. In an embodiment, the third layer 36 comprises the bottom layer of the fracture film 30, which is adjacent the metal end 14.

In an embodiment, the first layer 32 of the fracture film 30 comprises high density polyethelene (HDPE). The HDPE, in some embodiments, acts as a relatively stiff backbone for the fracture film 30. The HDPE layer additionally benefits the manufacturing process by reducing curl and causing the membrane lid 20/fracture film 30 lamination to be easier to cut (discussed below).

In an embodiment, the second layer 34 of the fracture film 30 comprises polybutene-1/ethylene-vinyl acetate (PB-EVA). In an embodiment, the PB-EVA layer serves as the fracture layer of the fracture film 30. That is, the PB-EVA layer may be designed to weaken, fracture, and/or peel during the removal of the membrane lid 20 from the metal end 14. In some embodiments, the PB-EVA layer serves as a tie layer. In some embodiments, the PB-EVA cohesively bonds the layers on either side of it. In an embodiment, the ratio of EVA to PB in the PB-EVA layer may be approximately 2:1 by weight. In an embodiment, the ratio of EVA to PB in the PB-EVA layer may be less than or equal to 2:1 by weight.

In an embodiment, the third layer 36 of the fracture film 30 comprises ethylene-acrylic acid (EAA). In an embodiment, the EAA layer serves as the contact layer or seal layer between the membrane lid 20 and the metal end 14.

In an embodiment, the fracture film 30 may have a thickness of between about 1.0 and 2.0 mil. In another embodiment, the fracture film 30 may have a thickness of about 1.5 mil. In an embodiment, the layer distribution of the fracture film 30 is approximately 70% HDPE, approximately 10% to 15% PB-EVA, and approximately 10% to 15% EAA.

In an embodiment, the first layer 32 is bonded to the second layer 34 and the second layer 34 is bonded to the third layer 36. In another embodiment, the first layer 32 and third layer 36 are bonded via the second layer 34—that is the second layer 34 acts as a bonding agent for the first layer 32 and third layer 36.

In an embodiment, the fracture film 30 is configured to fracture internally upon peeling back of the membrane lid 20 by a consumer. In an embodiment, the second layer 34 of the fracture film 30 is configured to fracture internally upon peeling of the peelable membrane 20. In this embodiment, a portion of the second layer 34 may remain adhered to the first layer 32 and a portion of the second layer 34 may remain adhered to the third layer 36.

In another embodiment, the fracture film is configured to separate between the second layer 34 and the third layer 36 upon peeling of the peelable membrane 20. In still another embodiment, the fracture film is configured to separate between the second layer 34 and the first layer 32 upon peeling of the peelable membrane 20. In an embodiment, at least a portion of the third layer 36 remains on the metal end 14 after removal of the peelable membrane 20 by a consumer. In an embodiment, the entire third layer 36 remains on the metal end 14 after removal of the peelable membrane 20 by a consumer. In an embodiment, at least a portion of the second layer 34 and the third layer 36 remain on the metal end 14 after removal of the peelable membrane 20 by a consumer. In another embodiment, the entire second layer 34 and the entire third layer 36 remain on the metal end 14 after removal of the peelable membrane 20 by a consumer.

In an embodiment, the remnants 50 of the second layer 34 and/or third layer 36 (also referred to as the footprint 50) which remain on the metal end 14 after removal of the peelable membrane 20 by a consumer may provide a consumer with confidence that the seal was effective prior to his or her opening of the container 10, providing a tamper evidence feature. This footprint 50 may comprise a visible ring that remains on the metal end 14. In other embodiments, the footprint 50 may comprise a discontinuous visible ring.

By designing the peelability mechanism (i.e. the fracturing) into the film itself (i.e. in contrast to the peeling occurring between the sealant and the metal end), the present invention does not depend on the seal strength of the membrane lid to the metal end to determine total seal strength, as the membrane is not designed to separate cleanly from the metal end. Rather, because the fracture film 30 of the invention fractures internally, it can be utilized in combination with any peelable membrane known in the art and any container end known in the art. The seal strength of the fracture film 30 defines the seal strength of the closure, regardless of the particular peelable membrane or container end utilized.

In some embodiments, the thickness of the various layers may be altered to improve functional characteristics of the container structure. For example, if the EAA layer is provided in a thinner layer, the membrane lid 20 has a lower peel force and may be easier to peel. Likewise, if the EAA layer is provided as a thicker layer, the peel force of the structure will be increased and the membrane lid 20 may be more difficult to remove. Similarly, if the PB-EVA layer contains greater amounts of PB, the resulting structure will require a lower peel force and will be more easily peelable. Likewise, if the PB content is decreased, the resulting structure may require a higher peel force and may be more difficult to peel. Still further, the EAA layer may be internally modified to affect functional characteristics of the container construction. For example, if the amount of acrylic acid within the EAA layer is increased, the resulting membrane lid 20 will have a greater affinity to the metal end 14 (or any end), creating a more effective seal. Likewise, if the amount of acrylic acid within the EAA layer is decreased, the resulting membrane lid 20 will have a lower affinity to the metal end 14 (or any end), creating a less effective seal.

The closure system of the invention can be employed with various types of metal ends, including bare (i.e., uncoated) metal as well as coated metal. As examples, the invention is applicable to spot-coated electro-tin-plated (ETP) steel as well as uncoated ETP steel. The invention is advantageous in that the blow-off strength and peel-force characteristics of the seal between the peelable lid 20 and the metal end 14 are not affected to a substantial extent by the surface characteristics of the metal end (i.e., whether it is uncoated or coated, etc.) because the failure mechanism of the seal occurs within the fracture film 30.

In an embodiment, the membrane lid 20 has a holding force to the end of the can which is sufficient to reliably maintain vacuum and/or seal during handling conditions, including packaging, shipping and long storage of the cans, while concurrently being removable with a peel force acceptable to a consumer of average strength.

Method of Manufacture

In an embodiment, the method for manufacturing the container of the invention comprises formation of a fracture film as described herein. In an embodiment, the fracture film is formed via a blown film line (i.e. blown film extrusion) or cast film line, as such methods are known in the art. Likewise, the layers which comprise the peelable membrane lid are laminated together using a permanent adhesive. In an embodiment wherein the peelable membrane lid comprises three layers, an adhesive may be applied to a first layer of the membrane lid and the first layer may then be adhesively joined to a second layer of the membrane lid. An adhesive may be applied to a second layer of the membrane lid (or, alternatively to the third layer of the membrane lid) and the second layer of the membrane lid and the third layer may then be adhesively joined to form a laminated membrane lid.

The fracture film is then laminated to the underside of the peelable membrane lid using a permanent adhesive in a similar manner. Lamination may be accomplished using a laminating machine comprising two rollers forming a nip therebetween, or may be accomplished using any other method known in the art.

In an embodiment, the fracture film is laminated to the underside of the peelable membrane lid in sheet form, such that the fracture film is coextensive with the peelable membrane. That is, the fracture film covers the entirety of the underside of the peelable membrane.

In an embodiment, the laminated film is then fed to a cutting station where the film may be cut into discrete lids which are sized for a particular container application. In an embodiment, the lids are cut to include a pull tab which extends from a side of the lid. In an embodiment, the lids are generally circular, with the exception of the pull tab. The lids may be cut with a laser, a die cutting machine or by any other suitable means known in the art. The skeleton of the laminate may be removed and discarded.

In an embodiment, the cut membrane lids are then sealed to preformed metal ends. In a particular embodiment, the membrane lid is induction sealed to the metal end. In an embodiment, the metal end comprises a flange or ring to which the membrane lid is sealed. The induction sealing process may comprise induction heating the metal end and then applying the lid to the heated end under pressure. In an embodiment, the sealing may occur at a temperature range of between about 250° F. to about 500° F. for 1 second using pressure of about 40 PSI.

The fracture film will seal to the metal end. In an embodiment, the peelability of the membrane lid may be altered based upon the processing conditions. For example, if more heat and/or pressure are applied during the induction heating process, the resulting container may have a lower peel strength and may be easier to peel. The converse is also true.

Many other modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible membrane lid comprising:
   one or more adjacent layers comprising metal foil, polymer film, metalized polymer film or paper; and
   a fracture film adhered to the one or more adjacent layers comprising:
      a stiff layer comprising high density polyethylene;
      a fracture layer; and
      a sealing layer, wherein the fracture layer cohesively bonds the stiff layer and the sealing layer.

2. A flexible membrane lid comprising:
   one or more adjacent layers comprising metal foil, polymer film, metalized polymer film or paper; and
   a fracture film adhered to the one or more adjacent layers comprising:
      a stiff layer;
      a fracture layer comprising polybutene-1/ethylene-vinyl acetate; and
      a sealing layer, wherein the fracture layer cohesively bonds the stiff layer and the sealing layer.

3. The flexible membrane lid of claim 1, wherein the sealing layer of the fracture film comprises ethylene-acrylic acid.

4. The flexible membrane lid of claim 1, wherein the fracture film is sealed to a metal end of a container.

5. The flexible membrane lid of claim 4, wherein the fracture film is configured to fracture internally upon peeling of the flexible membrane lid away from the metal end of the container.

6. The flexible membrane lid of claim 5, wherein the fracture film is configured to separate at the fracture layer such that a first portion of the fracture layer is bonded with the stiff layer, and a second portion of the fracture layer is bonded with the sealing layer.

7. The flexible membrane of claim 4, wherein upon peeling of the flexible membrane away from the container, a footprint of the fracture film remains on the metal end.

8. The flexible membrane of claim 7 wherein the footprint is one of a segment of the sealing layer, the sealing layer, the sealing layer and a portion of the fracture layer, or the sealing layer and the fracture layer.

9. The flexible membrane of claim 1, wherein the one or more adjacent layers includes a first layer comprising polyethylene terephthalate; a second layer comprising foil adhered to the first layer; and a third layer comprising nylon adhered to the second layer.

10. The flexible membrane of claim 2, wherein the weight of ethylene-vinyl acetate in the fracture layer is up to twice the weight of polybutene-1 in the fracture layer.

11. A flexible membrane lid comprising:
    one or more adhered layers comprising metal foil, polymer film, metalized polymer film or paper; and
    a fracture film adhered to the one or more adjacent layers comprising:
       a first layer comprising high density polyethylene;
       a second layer comprising polybutene-1/ethylene-vinyl acetate, wherein the second layer is bonded to the first layer;
       a third layer comprising ethylene-acrylic acid, wherein the third layer is bonded to the second layer; and
       wherein the fracture film is configured to fracture internally upon peeling of the flexible membrane lid such that a portion of the fracture film remains adhered to the one or more adheres layers, and a second portion becomes a footprint.

12. The flexible membrane lid of claim 11, wherein the second layer is a covalent bond between the first layer and the third layer.

13. The flexible membrane lid of claim 11, wherein the fracture film is sealed to an end of a container.

14. The flexible membrane lid of claim 13, wherein the footprint is adhered to a metal end of the container upon peeling of the flexible membrane lid.

15. The flexible membrane lid of claim 11, wherein the footprint is one of: a portion of the third layer, the third layer, the third layer and a portion of the second layer or the third layer and the second layer.

16. The flexible membrane lid of claim 11, wherein the fracture film is adhered about the perimeter of the one or more adhered layers.

17. The flexible membrane lid of claim 11, wherein the one or more adhered layers includes a primary layer comprising polyethylene terephthalate; a secondary layer comprising foil adhered to the primary layer; and a tertiary layer comprising nylon adhered to the secondary layer.

18. The flexible membrane lid of claim 11, wherein the weight of ethylene-vinyl acetate in the second layer is up to twice the weight of polybutene-1 in the second layer.

19. The flexible membrane of claim 11, wherein the fracture film is comprised from at least 70% high density polyethylene, between 10% and 15% polybutene-1/ethylene-vinyl acetate and between 10% and 15% ethylene-acrylic acid by weight.

* * * * *